(12) United States Patent
Batke

(10) Patent No.: US 11,452,648 B2
(45) Date of Patent: Sep. 27, 2022

(54) WHEELCHAIR SUSPENSION

(71) Applicant: VELOX MANUFACTURING INC., Langley (CA)

(72) Inventor: Ryan Batke, Langley (CA)

(73) Assignee: Velox Manufacturing Inc., Langley (CA)

( * ) Notice: Subject to any disclaimer, the term of this patent is extended or adjusted under 35 U.S.C. 154(b) by 82 days.

(21) Appl. No.: 17/046,715

(22) PCT Filed: Apr. 10, 2018

(86) PCT No.: PCT/CA2018/050444
§ 371 (c)(1),
(2) Date: Oct. 9, 2020

(87) PCT Pub. No.: WO2019/195911
PCT Pub. Date: Oct. 17, 2019

(65) Prior Publication Data
US 2021/0145667 A1    May 20, 2021

(51) Int. Cl.
*A61G 5/06* (2006.01)
*A61G 5/10* (2006.01)
*A61G 5/04* (2013.01)
*B60G 5/06* (2006.01)

(52) U.S. Cl.
CPC .............. *A61G 5/06* (2013.01); *A61G 5/043* (2013.01); *A61G 5/1078* (2016.11); *A61G 5/04* (2013.01); *B60G 5/06* (2013.01); *B60G 2204/422* (2013.01); *B60G 2300/24* (2013.01)

(58) Field of Classification Search
CPC ........ A61G 5/043; A61G 5/06; A61G 5/1078; A61G 5/04; B60G 5/06; B60G 2204/422; B60G 2300/24
See application file for complete search history.

(56) References Cited

U.S. PATENT DOCUMENTS

| | | |
|---|---|---|
| 6,070,898 A | 6/2000 | Dickie et al. |
| 6,129,165 A | 10/2000 | Schaffner et al. |
| 6,176,335 B1 | 1/2001 | Schaffner et al. |
| 6,601,863 B1 | 8/2003 | Mentessi et al. |

(Continued)

FOREIGN PATENT DOCUMENTS

| | | |
|---|---|---|
| EP | 1192923 A2 | 4/2002 |
| JP | 4643397 B2 | 3/2011 |

(Continued)

*Primary Examiner* — Frank B Vanaman
(74) *Attorney, Agent, or Firm* — Oyen Wiggs Green & Mutala LLP

(57) ABSTRACT

A suspension for a wheelchair, wherein the suspension comprises: a frame, a motor carrier pivotally mounted on the frame to rotate about a motor carrier axis, a drive wheel having a bottom and mounted on the motor carrier to rotate about a drive wheel axis, a swing arm pivotally mounted on the frame to rotate about a swing arm axis, a swing wheel having a bottom and mounted on the swing arm to rotate about a swing wheel axis, a first contact surface coupled to move in concert with the motor carrier, and a second contact surface coupled to move in concert with the swing arm and configured to contact the first contact surface and transfer an upward force on the swing wheel into a downward force on the drive wheel.

20 Claims, 14 Drawing Sheets

(56) References Cited

U.S. PATENT DOCUMENTS

| | | |
|---|---|---|
| 7,040,429 B2 | 5/2006 | Molnar |
| 7,083,195 B2 | 8/2006 | Goertzen et al. |
| 7,264,272 B2 * | 9/2007 | Mulhern ............... A61G 5/043 |
| | | 280/755 |
| 7,506,709 B2 * | 3/2009 | Kiwak .................. B62K 5/007 |
| | | 280/124.1 |
| 7,896,394 B2 * | 3/2011 | Jackson ............... A61G 5/1078 |
| | | 280/755 |
| 8,172,015 B2 * | 5/2012 | Molnar ................ A61G 5/1078 |
| | | 180/907 |
| 9,308,143 B2 | 4/2016 | Bekoscke et al. |
| 2003/0075365 A1 | 4/2003 | Fought |
| 2005/0034903 A1 | 2/2005 | Wu |
| 2005/0127631 A1 | 6/2005 | Schaffner |
| 2008/0053720 A1 * | 3/2008 | Chen ....................... A61G 5/06 |
| | | 180/65.1 |
| 2009/0145677 A1 * | 6/2009 | Zhou ................... A61G 5/1078 |
| | | 280/124.128 |
| 2010/0102529 A1 * | 4/2010 | Lindenkamp ........ A61G 5/1078 |
| | | 280/124.128 |
| 2010/0219623 A1 | 9/2010 | Mulhern et al. |

FOREIGN PATENT DOCUMENTS

| | | |
|---|---|---|
| JP | 5946928 B1 | 7/2016 |
| WO | 2018054694 A1 | 3/2018 |

\* cited by examiner

WHEELCHAIR SUSPENSION

TECHNICAL FIELD

The present disclosure is directed to suspension systems. More particularly, the present disclosure is directed to suspension systems for powered wheelchairs.

BACKGROUND

Wheelchairs provide improved mobility, especially for individuals with limited physical abilities. Powered wheelchairs provide further enhanced mobility for individuals with even further restricted physical abilities, and allow freedom for a segment of the population.

Potential barriers to wheelchairs, and users of wheelchairs, are curbs and edges as are commonly encountered in cities and buildings. Various suspension systems for powered wheelchairs have been developed to allow wheelchairs to climb curbs and other edges. However, many of the existing suspension systems suffer from various drawbacks.

A powered wheelchair may be constructed with six wheels, for example, one powered wheel and two unpowered wheels per side. Where one out of the three wheels on each side is powered, the center wheel is most commonly the powered wheel. Powering the center wheel of each side allows the wheelchair to turn with a very tight radius. However, one drawback of powering only the center wheel is the possibility that the drive wheel may lose traction with the ground, for example, when the wheelchair is climbing large bumps or a street curb. If the drive wheel loses traction with the ground, the wheelchair will become stuck. This is of particular concern for individuals with limited mobility.

There is a general desire for a wheelchair suspension with improved stability and comfort while travelling over small bumps and minor debris, while maintaining the ability to climb curbs and large bumps without losing tracking of the drive wheels.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a suspension for a wheelchair, the suspension comprises: a frame; a motor carrier pivotally mounted on the frame to rotate about a motor carrier axis; a drive wheel mounted on the motor carrier to rotate about a drive wheel axis; a swing arm pivotally mounted on the frame to rotate about a swing arm axis; and a swing wheel mounted on the swing arm to rotate about a swing wheel axis. A first contact surface coupled to move in concert with the motor carrier and a second contact surface coupled to move in concert with the swing arm are configured to contact the first contact surface and transfer an upward force on the swing wheel into a downward force on the drive wheel.

In some embodiments the motor carrier axis and the swing arm axis are coaxial.

In some embodiments the second contact surface is further configured to contact the first contact surface when the swing arm rotates about the swing arm axis by an engagement angle from a neutral position, wherein the swing arm is in the neutral position when a bottom of the swing wheel and a bottom of the drive wheel are aligned in a substantially horizontal plane.

In some embodiments a motor carrier shock absorber is connected between the frame and the motor carrier and configured to dampen a motion between the motor carrier and the frame, and a swing arm shock absorber is connected between the frame and the swing arm and configured to dampen a motion between the swing arm and the frame.

In some embodiments the motor carrier shock absorber is configured to bias the motor carrier towards a neutral position relative to the frame; the swing arm shock absorber is configured to bias the swing arm towards a neutral position relative to the frame; and the motor carrier is in the motor carrier neutral position and the swing arm is in the swing arm neutral position when the bottom of the drive wheel and the bottom of the swing wheel are aligned in a substantially horizontal plane.

In some embodiments the bottom of the swing wheel and the bottom of the drive wheel form a base plane when substantially aligned in a horizontal plane, and the second contact surface is further configured to contact the first contact surface when the bottom of the swing wheel is raised by an engagement distance from the base plane In some embodiments the upward force on the swing wheel causes a swing arm torque on the swing arm about the swing arm axis, and the second contact surface is configured to transfer the swing arm torque into a motor carrier torque on the motor carrier about the motor carrier axis, wherein a direction of the swing arm torque is substantially equal to a direction of the motor carrier torque.

One aspect of the invention provides a suspension for a wheelchair comprising: a frame; a motor carrier pivotally mounted on the frame to rotate about a motor carrier axis; a swing arm pivotally mounted on the frame to rotate about a swing arm axis; and a torque transfer means configured to transfer a swing arm torque on the swing arm about the swing arm axis into a motor carrier torque on the motor carrier about the motor carrier axis when an angle between the motor carrier and the swing arm is equal to or less than an engagement angle.

One aspect of the invention provides a suspension for a wheelchair comprising: a frame comprising a first side and a second side opposed to the first side; a first motor carrier pivotally mounted on the first side of the frame to rotate about a first motor carrier axis; a second motor carrier pivotally mounted on the second side of the frame to rotate about a second motor carrier axis; a first drive wheel having a bottom and mounted on the first motor carrier to rotate about a first drive wheel axis; a second drive wheel having a bottom and mounted on the second motor carrier to rotate about a second drive wheel axis; a first swing arm pivotally mounted on the first side of the frame to rotate about a first swing arm axis; a second swing arm pivotally mounted on the second side of the frame to rotate about a second swing arm axis; a first swing wheel having a bottom and mounted on the first swing arm to rotate about a first swing wheel axis; a second swing wheel having a bottom and mounted on the second swing arm to rotate about a second swing wheel axis; a first contact surface coupled to move in concert with the first motor carrier; a second contact surface coupled to move in concert with the first swing arm and configured to contact the first contact surface and transfer an upward force on the first swing wheel into a downward force on the first drive wheel; a third contact surface coupled to move in concert with the second motor carrier; and a fourth contact surface coupled to move in concert with the second swing arm and configured to contact the third contact surface and transfer an upward force on the second swing wheel into a downward force on the second drive wheel.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
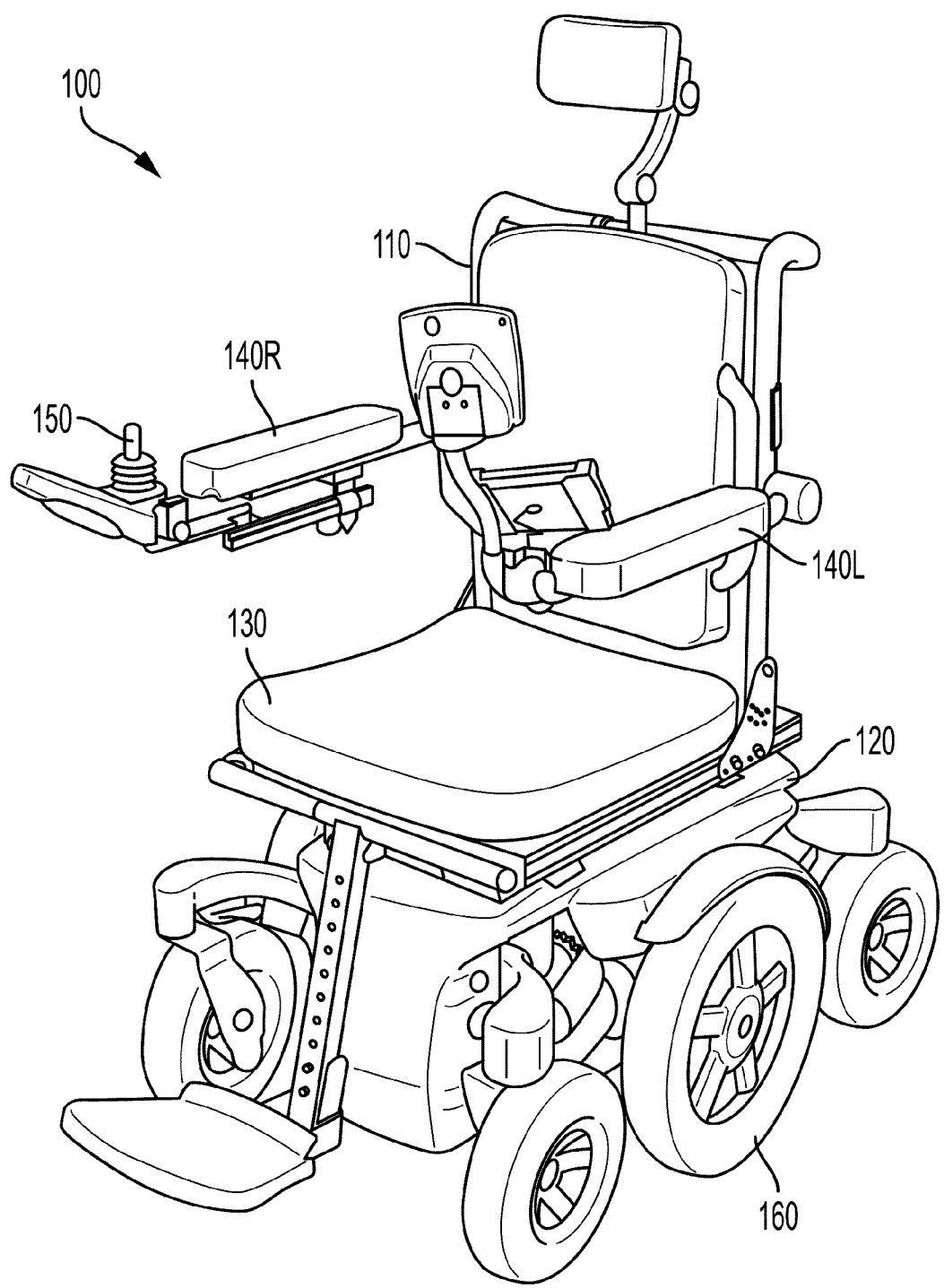
FIG. 1 depicts a wheelchair according to an example embodiment.

FIG. 1 depicts a powered wheelchair 100 comprising a chair 110 mounted upon undercarriage 120. Chair 110 comprises seat 130 and armrests 140R and 140L. Chair 110 may be a chair specifically adapted to accommodate individuals with reduced mobility. Chair 110 may have control 150 for operating wheelchair 100. Control 150 may be mounted at a convenient location such as on one of the armrests, for example armrest 140R. Control 150 may be a joystick control, or another suitable control for operating wheelchair 100 such as a sip and puff control. Some or all of the features of wheelchair 100 may be incorporated into any of the embodiments described below.

Undercarriage 120 comprises suspension 160 comprising a plurality of wheels. One or more motors drive two or more of the wheels. Wheelchair 100 includes a power source operable to supply power to the motors. The power source may be an electrical power source, for example one or more batteries.

In some embodiments, control 150 operates the one or more motors to pilot wheelchair 100. Control 150 may operate the one or more motors to drive the two or more wheels of suspension 160 at different speeds to steer wheelchair 100.

Figure 2:
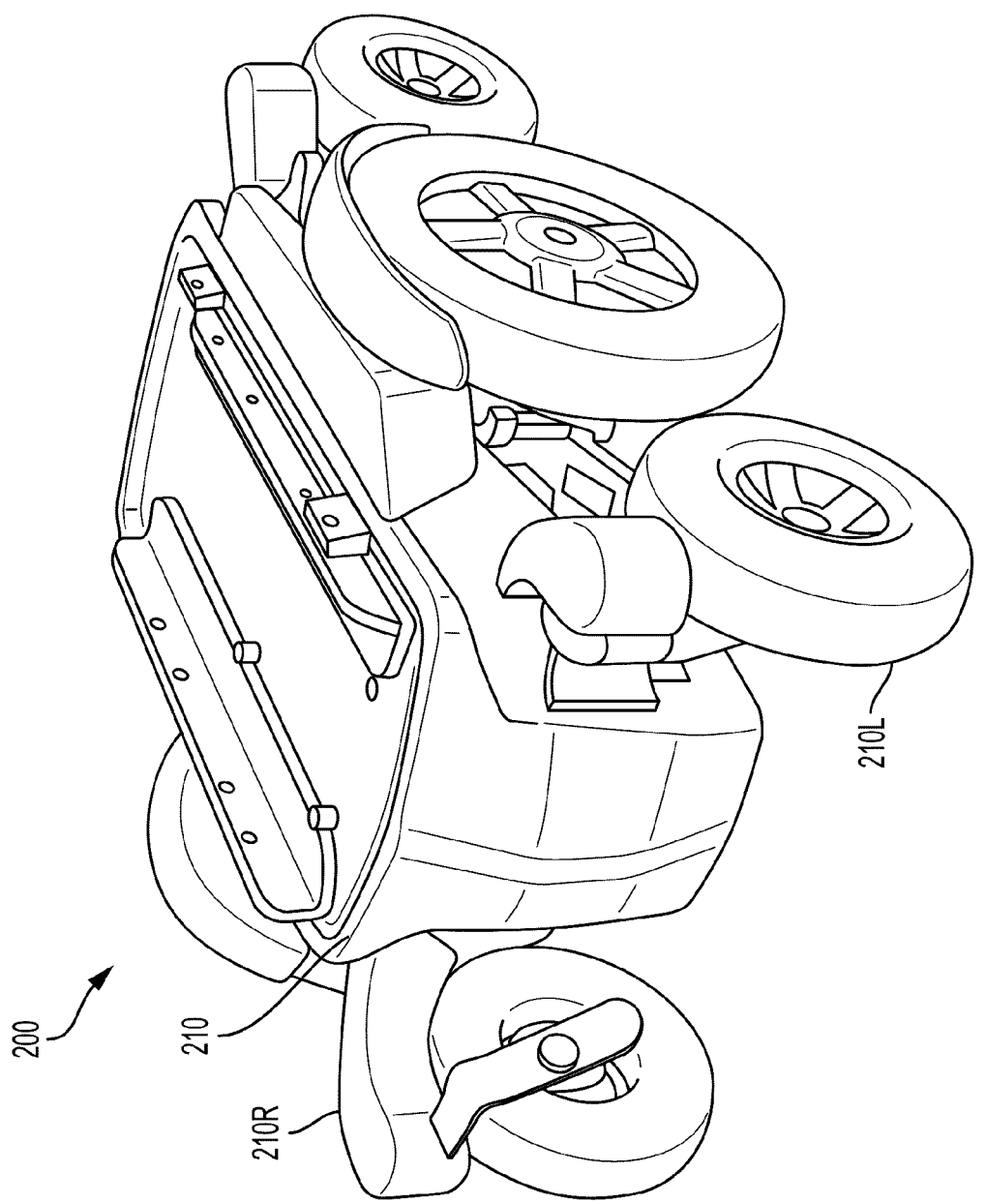
FIG. 2 depicts a wheelchair suspension according to an example embodiment.

FIG. 2 depicts suspension 200, which in some embodiments may be the suspension of a wheelchair 100. Suspension 200 comprises frame 210, upon which are mounted two sets of wheels, 210R and 210L. Each set of wheels 210R and 210L comprises two or more wheels. In some embodiments, each set of wheels 210R and 210L comprises three wheels. In embodiments where each set of wheels 210R and 210L comprises three wheels, each set of wheels 210R and 210L may comprise a swing wheel, a drive wheel, and a rear wheel. The drive wheel may be mounted between the corresponding swing wheel and rear wheel. In some embodiments one or both of the swing wheel and the rear wheel of each set of wheels 210R and 210L are caster wheels.

A motor is provided for driving at least one driven wheel of each set of wheels 210R and 210L. In some embodiments, suspension 200 comprises two or more motors wherein a drive wheel of each set of wheels 210R and 210L is driven by a separate motor.

To reduce the likelihood that the drive wheels will lose traction with the ground, each drive wheel may be mechanically linked to the corresponding swing wheel by a linkage which forces the drive wheel down in response to the swing wheel being lifted by more than a threshold amount. The mechanical linkage effectively transfers an upward force on the swing wheel into a downward force on the drive wheel. Linking corresponding swing and drive wheels reduces the likelihood that the drive wheels will lose traction with the ground when the swing wheels are raised sufficiently to lift a front end of the frame (e.g. when trying to drive up over a curb onto a sidewalk).

However, the inventor has realized that rigidly linking the swing and drive wheels would increase the rigidity of the suspension, and thereby decrease ride quality (i.e. more vibration would be transmitted to an occupant of the wheelchair as the wheels travel over rough ground). Furthermore rigidly coupling the swing and drive wheels would preclude providing independent suspension for the swing and drive wheels, further increasing the transmission of shocks on the wheels to the occupant of the wheelchair.

To avoid this problem, some embodiments of suspension 200 provide a mechanism for transferring an upward force on the swing wheel into a downward force on the drive wheel which is not engaged until the swing wheel has been raised by at least a certain distance. When the swing wheel has been raised by at least the certain distance then the mechanism transfers an upward force on the swing wheel into a downward force on the drive wheel, forcing the drive wheel down as the swing wheel is raised. This can improve traction as described above. Such a mechanism can permit independent suspension of the swing wheel and drive wheel within a range of relative movement between the swing wheel and the drive wheel. The independent suspension provides improved stability and comfort.

Figure 3A:
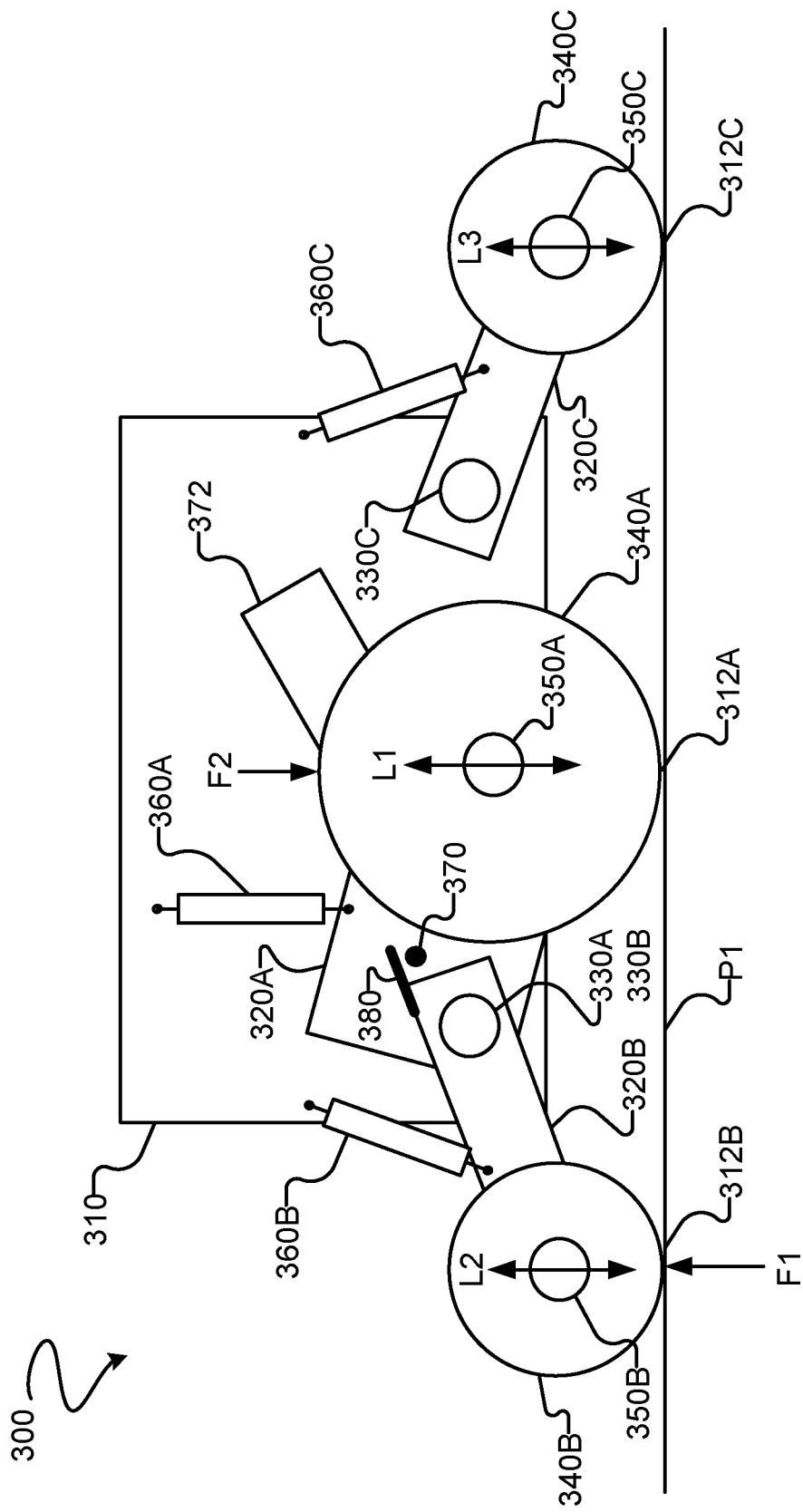
FIG. 3A is a schematic side view of a wheelchair suspension according to an example embodiment.

FIG. 3A is a schematic side view of a wheelchair suspension 300 according to an example embodiment. In some embodiments, suspension 300 is a suspension of wheelchair 100. Suspension 300 comprises frame 310. Motor carrier 320A is pivotally mounted to frame 310 to pivot about motor carrier axis 330A. Drive wheel 340A is rotatably mounted to motor carrier 320A to rotate about drive wheel axis 350A. Swing arm 320B is pivotally mounted to frame 310 to pivot about swing arm axis 330B. In this embodiment, swing arm axis 330B is coaxial with motor carrier axis 330A. Swing wheel 340B is rotatably mounted to swing arm 320B to rotate about swing wheel axis 350B. Rear arm 320C is pivotally mounted to frame 310 to pivot about rear arm axis 330C. Rear wheel 340C is rotatably mounted to rear arm 320C to rotate about rear wheel axis 350C.

FIG. 3A depicts motor 372 mounted on motor carrier 320A. Motor 372 is connected to drive rotation of drive wheel 340A. In some embodiments, one or both of swing wheel 340B and rear wheel 340C are caster wheels.

In some embodiments, one or more of motor carrier 320A, swing arm 320B, and rear arm 320C are additionally coupled to frame 310 by one or both of a biasing element and a dampening element. The biasing element may for example comprise coil springs, leaf springs, pneumatic springs, elastomeric springs or any other suitable biasing elements. The biasing elements bias the corresponding wheels of the wheelchair suspension in a downward direction. The biasing elements resist compression to support the weight of a wheelchair and its occupant. The configuration of suspension 300 when suspension 300 is sitting still on a flat horizontal surface and the biasing elements are balancing the weight of the wheelchair and its occupant may be called a 'neutral configuration'. If suspension 300 is disturbed then suspension 300 will tend to return to the neutral configuration.

The dampening elements may for example comprise shock absorbers of any suitable type or types (which may comprise, for example, pneumatic pistons, hydraulic pistons or the like). In some embodiments, the dampening element and the biasing element are combined in a single component, for example a shock absorber comprising a coiled spring surrounding a hydraulic damper.

Some embodiments of wheelchair suspension 300 may comprise one or more of: motor carrier shock absorber 360A mounted between frame 310 and motor carrier 320A, swing arm shock absorber 360B mounted between frame 310 and swing arm 320B, and rear arm shock absorber 360C mounted between frame 310 and rear arm 320C. In the illustrated embodiment, each of shock absorbers 360A, 360B and 360C comprises a dampening element and a biasing element. Shock absorbers 360A, 360B and 360C are respectively configured to damp movement of drive wheel 340A along direction L1, damp movement of swing wheel 340B along direction L2, and damp movement of rear wheel 340C along direction L3.

As a wheelchair equipped with suspension 300 is driven along, each of wheels 340A, 340B and 340C can move independently in response to any small bumps or debris that they encounter. The independent movement of each wheel, dampened by the corresponding shock absorbers, provides for a smooth ride.

In some embodiments, one or more of shock absorbers 360A, 360B and 360C are respectively configured so that motor carrier 320A, swing arm 320B, and rear arm 320C each tend to be in the positions that they have in the neutral configuration of suspension 300. An example of a neutral position is when bottom 312A of drive wheel 340A, bottom 3128 of swing wheel 340B, and bottom 312C of rear wheel 340C are substantially aligned in a horizontal plane P1 and shock absorbers 360A, 360B and 360C are balancing the weight of the wheel chair and an occupant.

FIG. 3A depicts an embodiment of suspension 300 comprising a torque transfer mechanism. In this example the torque transfer mechanism comprises a first contact surface 370 and a second contact surface 380. First contact surface 370 is connected to move in concert with motor carrier 320A. Second contact surface 380 is connected to move in concert with swing arm 320B. In the illustrated embodiment, first and second contact surfaces 370, 380 are respectively carried by motor carrier 320A and swing arm 320B. Second contact surface 380 is configured to contact first contact surface 370 at a certain angle between motor carrier 320A and swing arm 320B. When bottoms 312A and 3128 of wheels 340A and 340B are in the neutral position (as defined above), first and second contact surfaces 370 and 380 are spaced apart, i.e. not in contact. When first and second contact surfaces 370 and 380 are not in contact, drive wheel 340A and swing wheel 340B are independently suspended by respective shock absorbers 360A and 360B.

If swing wheel 340B is lifted far enough then first contact surface 370 and second contact surface 380 come into contact with one another. Once this has occurred, second contact surface 370 transfers any upward force F1 on swing wheel 340B into a downward force F2 on drive wheel 340A. Transferring an upward force F1 on swing wheel 340B into a downward force F2 on drive wheel 340A reduces the likelihood that drive wheel 340A will lose traction with the ground. When first contact surface 370 and second contact surface 380 are in contact, they may be referred to as being 'engaged'.

In some embodiments one or both of first and second contact surfaces 370, 380 comprises a resilient material (e.g. rubber or another elastomeric material) or is resiliently mounted. Resiliency in the contact between first and second contact surfaces 370, 380 can reduce noise and avoid generating shocks when first and second contact surfaces 370, 380 first come into contact with one another.

Figure 3B:
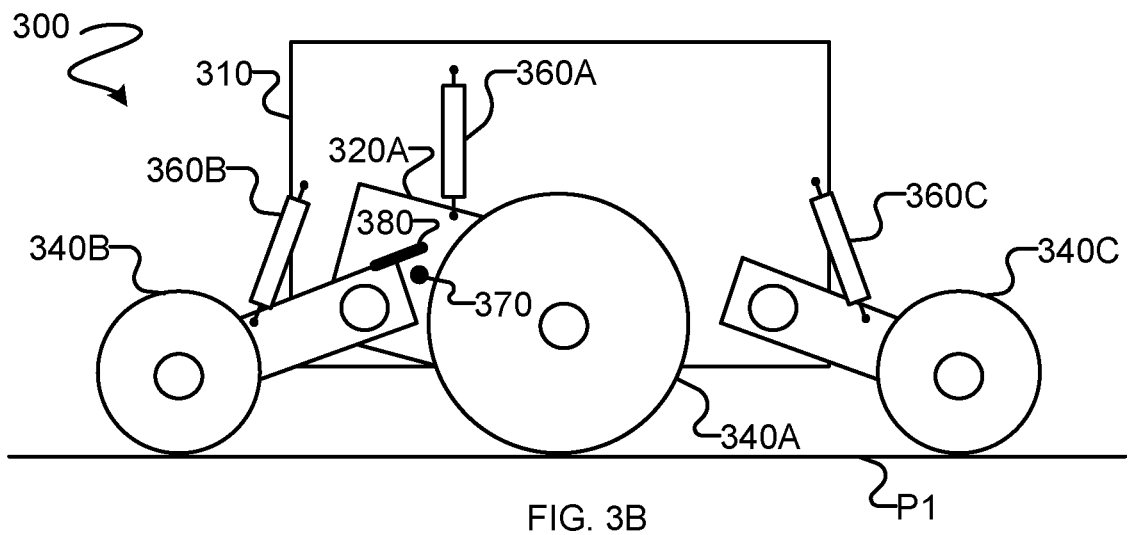
FIGS. 3B, 3C, 3D, 3E and 3F are schematic side views of a wheelchair suspension depicting a drive wheel and a swing wheel in various relative positions.

FIGS. 3B to 3F are schematic side views of wheelchair suspension 300. FIG. 3B depicts suspension 300 sitting on a smooth plane P1. When on an even surface, drive wheel 340A, swing wheel 340B and rear wheel 340C are in their respective neutral positions, as described above. In the neutral position, shock absorbers 360A, 360B and 360C are intermediate in position between fully extended and fully contracted; i.e. each of shock absorbers 360A, 360B and 360C is capable of contracting or expanding to dampen a motion in either direction along the length of the shock absorber.

When shock absorbers 360A, 360B and 360C of suspension 300 are in the neutral position, each of drive wheel 340A, swing wheel 340B, and rear wheel 340C may move upward and downward independently of the other wheels. Furthermore, any movement of drive wheel 340A, swing wheel 340B, and rear wheel 340C is dampened by respective shock absorbers 360A, 360B and 360C. Therefore, when in the neutral position, suspension 300 is capable of traversing fairly flat terrain comprising small bumps and minor debris while maintaining a relatively stable orientation, thereby providing a smooth ride for an occupant of the wheelchair.

Shock absorbers 360A, 360B and 360C may be selected to match a combined weight of the wheelchair and an individual occupant (e.g. so that in the neutral configuration each of shock absorbers 360A, 360B and 360C is neither very close to being fully compressed or very close to being fully extended).

FIGS. 3C to 3F illustrate how suspension 300 provides independent suspension of drive wheel 340A and swing wheel 340B for small deflections up or down of drive wheel 340A and/or swing wheel 340B.

Figure 3C:
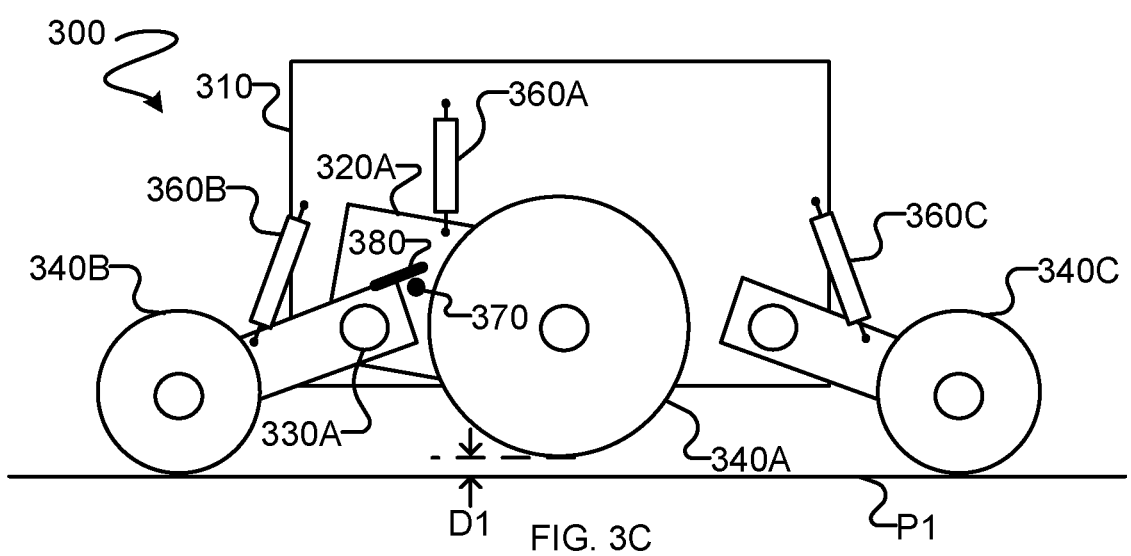

FIG. 3C depicts drive wheel 340A deflected by a distance D1 from plane P1 upward toward frame 310. This could occur for example when drive wheel 340A is driving over a small bump or minor debris. As drive wheel 340A deflects upward by distance D1, motor carrier 320A swings about axis 330A, and shock absorber 360A contracts. Instead of the upward deflection of drive wheel 340A being transferred to frame 310 (as would occur if drive wheel 340A were rigidly attached to frame 310), the contraction of shock absorber 360A absorbs the upward deflection of drive wheel 340A, thereby insulating frame 310 from the movement of drive wheel 340A.

When shock absorber 360A contracts due to upward deflection of drive wheel 340A upward towards frame 310 (as described above), a biasing element of shock absorber 360A may exert a downward force on drive wheel 340A, urging drive wheel 340A back toward the neutral position. Thus as suspension 300 drives forward and drive wheel 340A rolls over the small bump or debris which has deflected drive wheel 340A upward, shock absorber 360A will urge drive wheel 340A back into the neutral position once drive wheel 340A has cleared the small bump or debris. Thus drive wheel 340A will return to the neutral position, and shock absorber 360A will again be positioned to dampen a motion in either direction.

In the neutral position, shock absorber 360A dampens an upward deflection of drive wheel 340A independent of swing wheel 340B. In the neutral position depicted in FIG. 3B, first and second contact surfaces 370 and 380 are spaced apart by a distance. As drive wheel 340A deflects upward from plane P1 while swing wheel 340B remains along plane P1, first contact surface 370 moves towards second contact surfaces 380, as depicted in FIG. 3C. So long as distance D1 is insufficient to bring first and second contact surfaces 370 and 380 into contact, drive wheel 340A can move independently of swing wheel 340B.

Figure 3D:
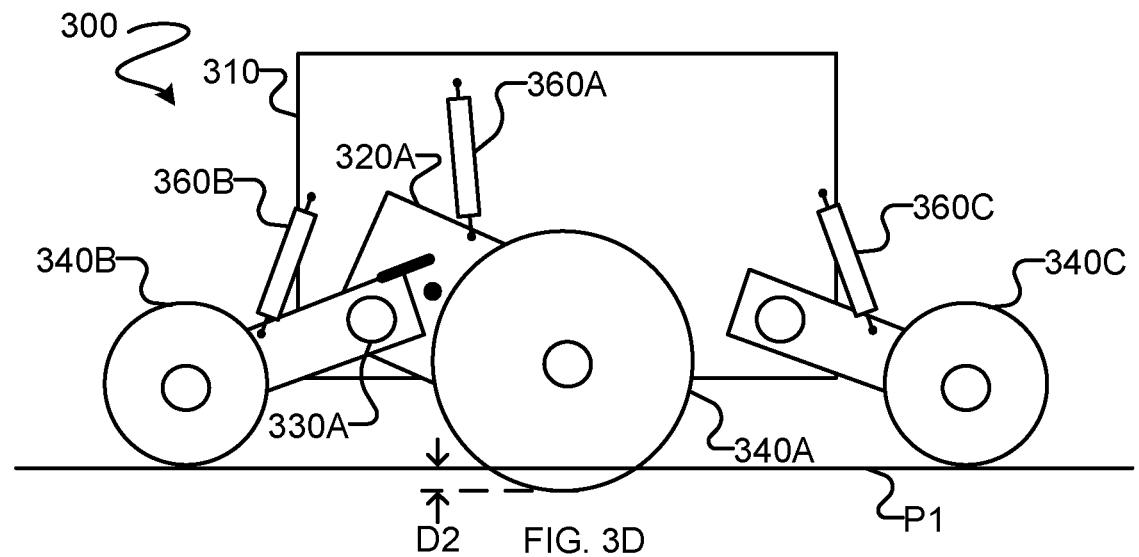

FIG. 3D depicts drive wheel 340A deflected away from frame 310 by a distance D2 from plane P1. This could occur, for example, as a result of drive wheel 340A driving over a divot. When drive wheel 340A deflects downward by distance D2, motor carrier 320A swings about axis 330A, and shock absorber 360A expands. Instead of the downward deflection of drive wheel 340A being transferred to frame 310 (as would be if drive wheel 340A were rigidly attached to frame 310), the expansion of shock absorber 360A absorbs the downward deflection of drive wheel 340A, thereby insulating frame 310 from the downward deflection of drive wheel 340A.

Figure 3E:
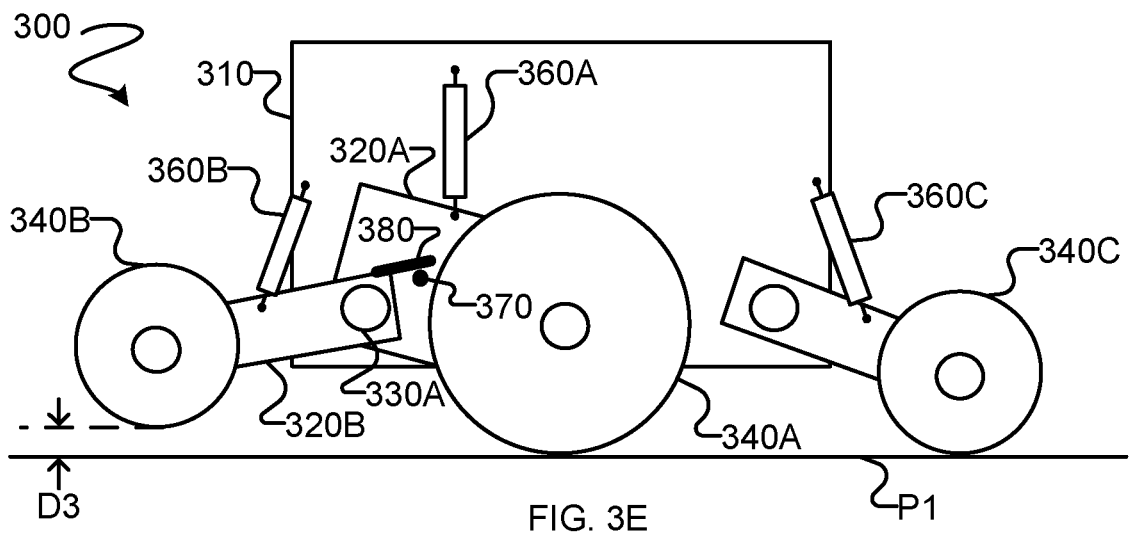

FIG. 3E depicts swing wheel 340B deflected by a distance D3 upward toward frame 310. This could occur, for example when swing wheel 340B is driven over a small bump or minor debris. When swing wheel 340B is deflected upward by distance D3, swing arm 320B rotates about axis 330A, and shock absorber 360B contracts. The contraction of shock absorber 360B dampens the upward deflection of swing wheel 340B, attenuating the transmission of the upward deflection of swing wheel 340B to frame 310. Through the motion of swing wheel 340B relative to frame 310, frame 310 remains relatively more stable than would be the case if the upward deflection of swing wheel 340B was transmitted directly to frame 310.

When shock absorber 360B contracts due to upward deflection of swing wheel 340B toward frame 310 (as described above), shock absorber 360B will exert a downward force on swing wheel 340B, urging swing wheel 340B back toward the neutral position. Thus as suspension 300 drives forward and swing wheel 340B has passed over the small bump or debris which has deflected swing wheel 340B upward, shock absorber 360B will urge swing wheel 340B back into its neutral position. Thus swing wheel 340B will return to the neutral position, and shock absorber 360B will again be positioned to dampen a motion in either direction.

In the neutral position, shock absorber 360B dampens an upward deflection of swing wheel 340B independently of drive wheel 340A. In the neutral position depicted in FIG. 3B, first and second contact surfaces 370 and 380 are spaced apart by a distance. As swing wheel 340B deflects upward from plane P1 while drive wheel 340A remains along plane P1, second contact surface 380 moves towards first contact surface 370, as depicted in FIG. 3E. So long as distance D3 is insufficient to bring first and second contact surfaces 370 and 380 into contact, swing wheel 340B can move upward independently of drive wheel 340A.

Figure 3F:
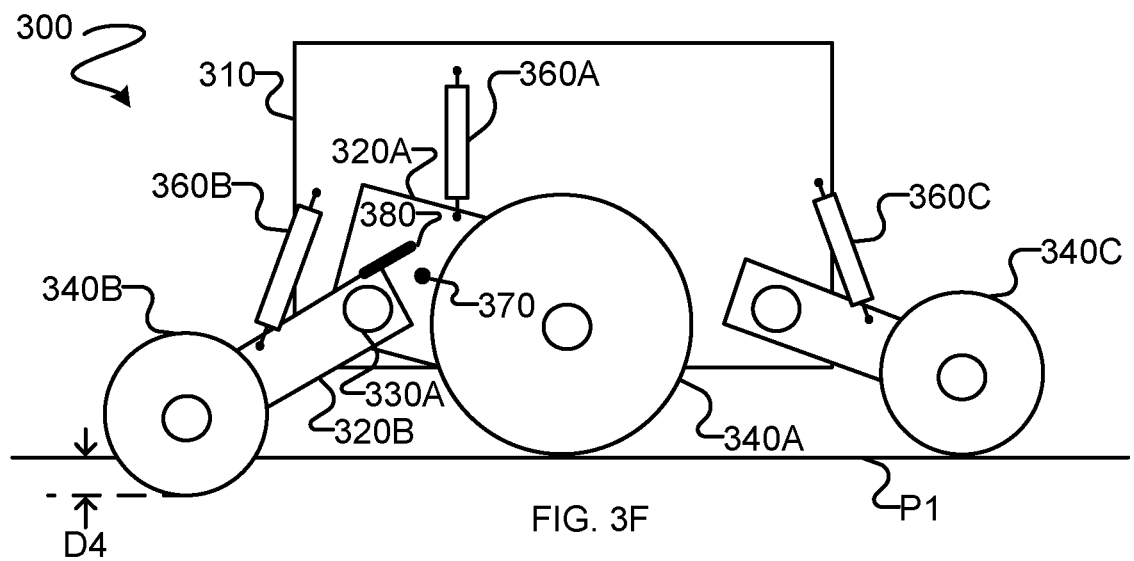

FIG. 3F depicts swing wheel 340B deflected by a distance D4 away from frame 310, for example as a result of swing wheel 340B driving over a divot. As swing wheel 340B deflects down by distance D4, swing arm 320B rotates about axis 330A, and shock absorber 360B expands. The expansion of shock absorber 360B dampens the downward deflection of swing wheel 340B, attenuating the transmission of the downward deflection of swing wheel 340B to frame 310. Through this attenuation, frame 310 remains relatively more stable than it would be if the downward deflection of swing wheel 340B were transmitted directly to frame 310.

FIGS. 3A to 3F depict one embodiment of suspension 300 wherein each of shock absorbers 360A, 360B and 360C are respectively configured to compress when wheels 340A, 340B and 340C are deflected toward frame 310, and to expand when wheels 340A, 340B and 340C are deflect away from frame 310. In other embodiments, one or more of shock absorbers 360A, 360B and 360C may be respectively configured to expand when wheels 340A, 340B and 340C deflect towards frame 310, and compress when one or more of wheels 340A, 340B and 340C deflect away frame 310.

Figure 4A:
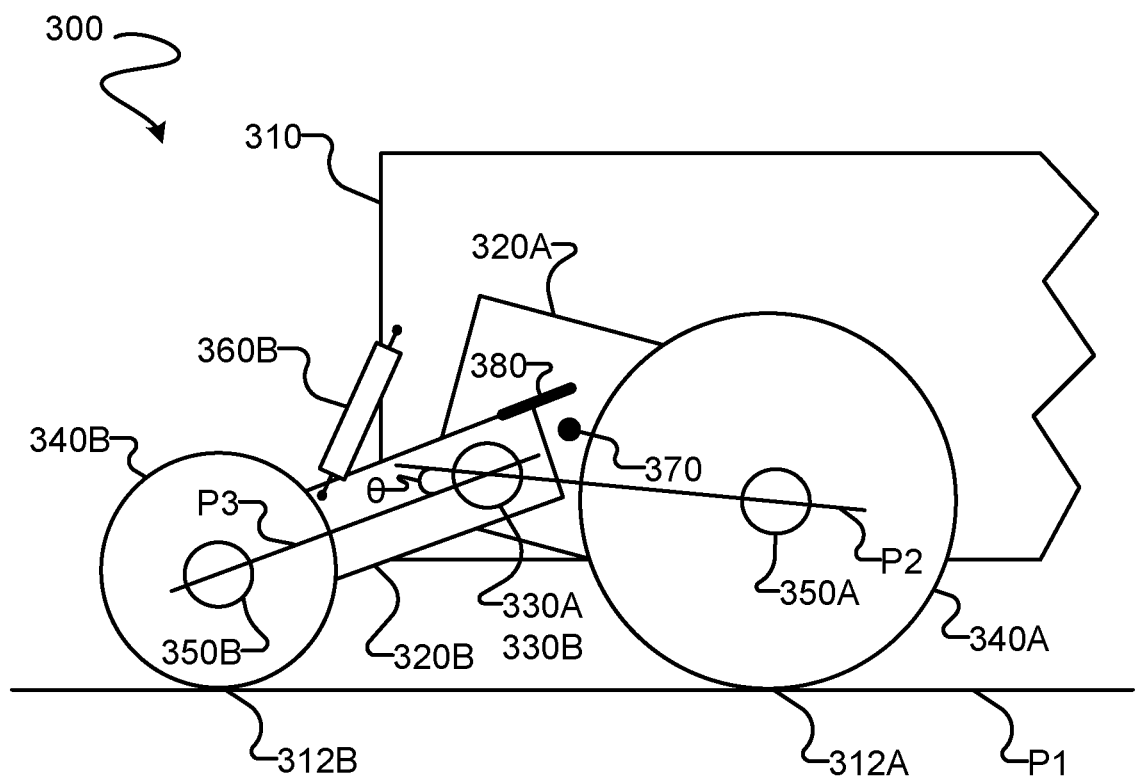
FIGS. 4A, 4B, 4C, 4D and 4E are partial schematic side views of a wheelchair suspension depicting a swing arm and motor carrier in various relative positions.

FIGS. 4A to 4E are partial schematic side views of wheelchair suspension 300. FIG. 4A depicts suspension 300 in a neutral position where bottom 312A of drive wheel 340A and bottom 312B of swing wheel 340B are substantially aligned in a horizontal plane P1. Angle θ is the angle between plane P2 defined by motor carrier axis 330A and drive wheel axis 350A and plane P3 defined by swing arm axis 330B and swing wheel axis 350B. When drive wheel 340A and swing wheel 340B are in their neutral positions as defined above, A is equal to neutral angle θ1 and second contact surface 380 is spaced a distance apart from first contact surface 370. As angle θ is reduced from neutral angle θ1, first and second contact surfaces 370, 380 approach one another.

Figure 4B:
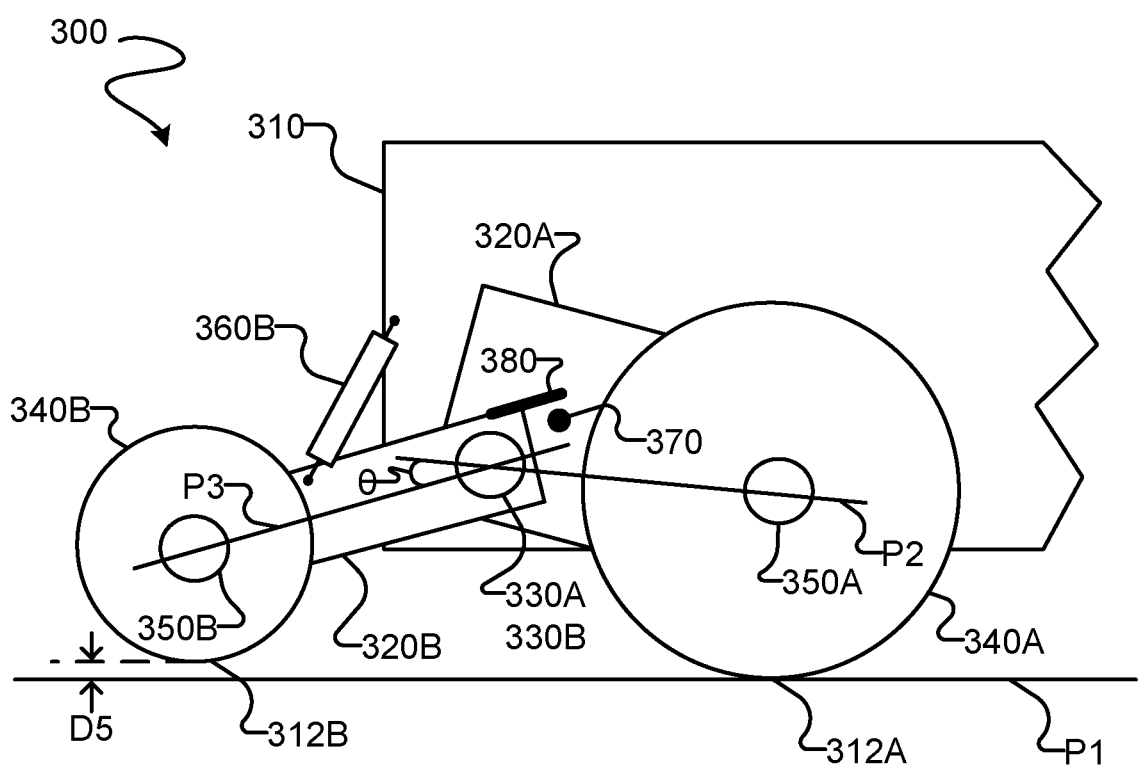

FIG. 4B depicts swing wheel 340B raised by a distance D5 from horizontal plane P1, for example, as a result of swing wheel 340B climbing over a small bump or minor debris. As swing wheel 340B is raised by distance D5, swing arm 320B rotates about swing arm axis 330B. As swing arm 320B rotates about swing arm axis 330B, second contact surface 380 is carried around swing arm axis 330B. If bottom 312A of drive wheel 340A has remained in plane P1, when second contact surface 380 rotates about swing arm axis 330B, second contact surface 380 will rotate towards first contact surface 370. As swing arm 320B rotates about swing arm axis 330B, angle θ decreases. So long as swing wheel 340B is raised by a distance less than an engagement distance (as defined below), second contact surface 380 will not contact first contact surface 370. When second contact surface 380 is not in contact with first contact surface 370, drive wheel 340A and swing wheel 340B remain unengaged. When unengaged, swing wheel 340B may swing up and down by up to the engagement distance independently of drive wheel 340A.

Figure 4C:
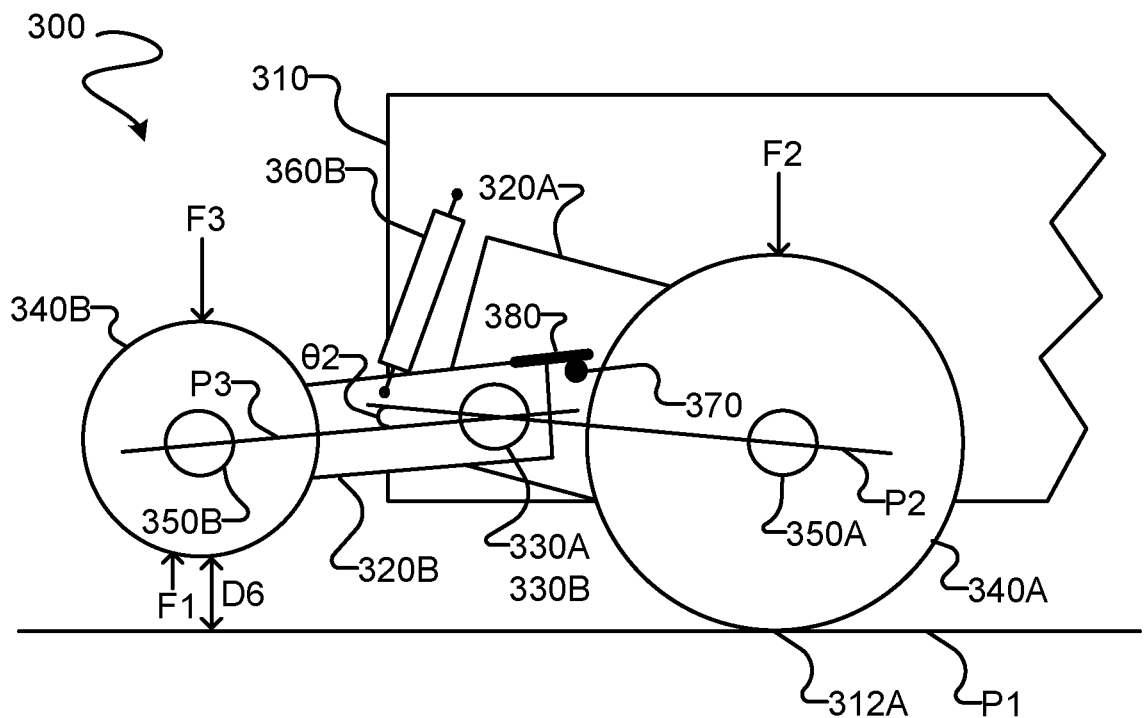

FIG. 4C depicts swing wheel 340B raised by a distance D6 from horizontal plane P1, for example, as a result of swing wheel 340B climbing up a large bump or street curb. Distance D6 may be referred to as an engagement distance, and is greater than distance D5. As swing wheel 340B is raised by distance D6 from plane P1, swing arm 320B rotates about swing arm axis 330B by an engagement angle θ3, where θ3 is the difference between θ1 and θ2, and where θ2 is the angle between plane P2 and plane P3 when second contact surface 380 contacts first contact surface 370. When the angle between P2 and P3 is equal to θ2, first contact surface 370 and second contact surface 380 are engaged.

When first contact surface 370 and second contact surface 380 are engaged, an upward force F1 on swing wheel 340B will rotate swing arm 320B about swing wheel axis 330B in a direction of force F1. As swing arm 320B rotates about swing wheel axis 330B in the direction of force F1, second contact surface 380 will also rotate about swing wheel axis 330B. Since first and second contact surfaces 370, 380 are engaged, second contact surface 380 pushes on first contact surface 370 and causes motor carrier 320A to rotate together with swing arm 320B. The result is that force F1 on swing wheel 340B is transferred into downward force F2 on drive wheel 340A. If bottom 312A of drive wheel 340A is resting on a surface, then force F2 on drive wheel 340A will increase the traction between drive wheel 340A and the surface.

Force F1 on swing wheel 340B results in a torque on swing arm 320B about swing arm axis 330B. When engaged (as defined above), second contact surface 380 transmits the torque on swing arm 320B into a torque on motor carrier 320A about motor carrier axis 330B through the contact between second contact surface 380 and first contact surface 370.

Force F2 on drive wheel 340A is a function of:
force F1;
the distance from motor carrier axis 330A to drive wheel axis 350A; and
the distance from swing arm axis 330B to swing wheel axis 350B.
In some embodiments, motor carrier axis 330A, drive wheel axis 350A, swing arm axis 330B and swing wheel axis 350B are positioned to achieve a desired relationship between force F1 and force F2. For example, force F2 may be greater than force F1 (e.g. F2=A*F1 where A is a coefficient that is larger than one, such as 2).

Another effect of the engagement of swing wheel 340B and drive wheel 340A is that lifting swing wheel 340B while drive wheel 340A is in contact with the ground will raise frame 310. Further, a mechanical advantage is provided due to the above noted ratio of F1 and F2. In this case, the engagement of contact surfaces 370 and 380 makes swing arm 320B and motor carrier 320A act as a lever with a fulcrum located at drive wheel axis 350A.

When drive wheel 340A and swing wheel 340B are engaged (as defined above), a net downward force F3 on swing wheel 340B will rotate swing arm 320B about swing arm axis 330B in a direction of force F3. When swing arm 320B rotates about swing arm axis 330B in the direction of net force F3, second contact surface 380 will rotate about swing arm axis 330B away from first contact surface 370, and drive wheel 340A and swing wheel 340B will return to being unengaged. Net downward force F3 may result from the force of gravity acting on swing arm 320B and swing wheel 340B exceeding force F1. Net downward force F3 may also result from a force from swing arm shock absorber 360B on swing arm 320B exceeding force F1.

In some embodiments, distance D6 is greater than a height of small debris and bumps, and less than a height of street curbs. For example, D6 may be in the range of about 3 centimetres to about 20 centimetres.

Figure 4D:
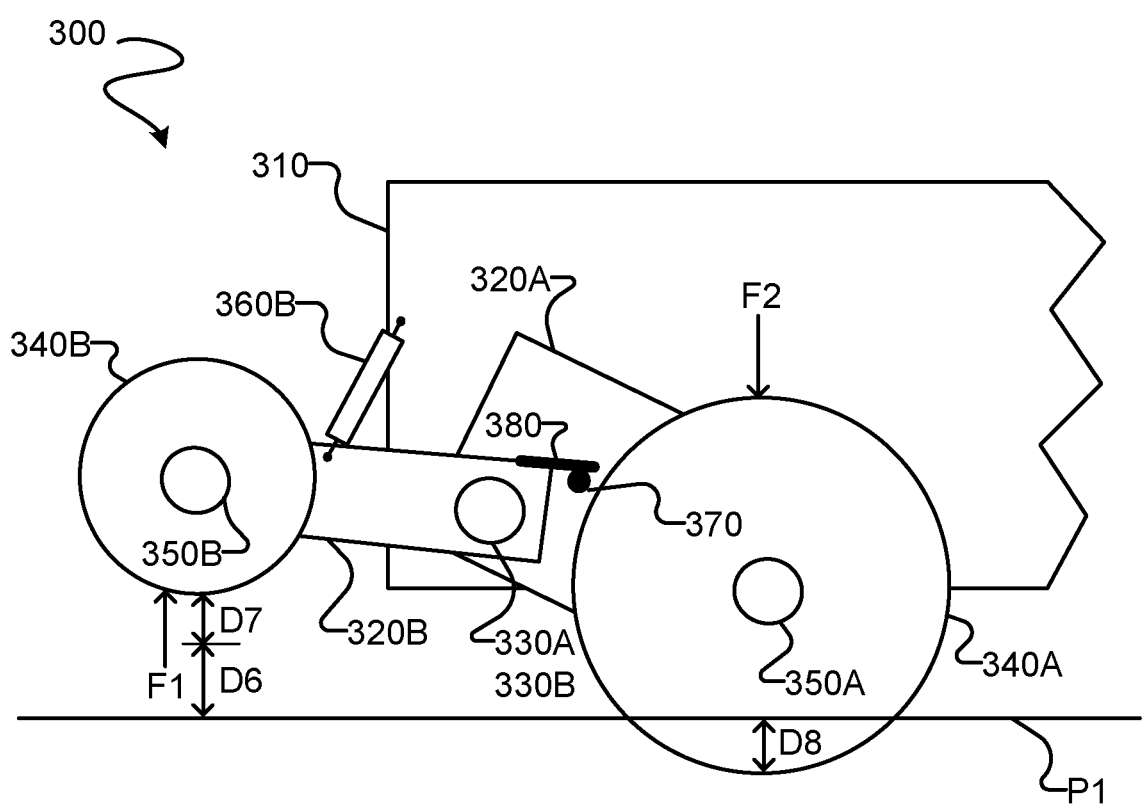

FIG. 4D depicts swing wheel 340B raised by force F1 from horizontal plane P1 by distance D7 which exceeds distance D6. As swing wheel 340B is raised by distance D7, swing arm 320B rotates about swing arm axis 330A in the direction of F1 until first and second contact surfaces 370 and 380 become engaged at distance D6. As swing arm 320B is lifted further towards distance D7, second contact surface 380 carried by swing arm 320B will rotate about swing arm axis 330B, and force first contact surface 370 to rotate an equal angle about motor carrier axis 330B. As first contact surface 370 is carried by motor carrier 320A, first contact surface 370 rotating about motor carrier axis 330B will rotate motor carrier 320A about motor carrier axis 330A. As motor carrier 320A rotates about motor carrier axis 330A, the center of drive wheel 340A will also rotate about motor carrier axis 330A so that drive wheel 340A is moved downward relative to frame 310 by a distance D8.

Distance D8 is a function of:
distance D7;
the distance from motor carrier axis 330A to drive wheel axis 350A; and
the distance from swing arm axis 330B to swing wheel axis 350B.
The relationship between distance D8 and distance D7 is the inverse of the relationship between force F1 and force F2. In some embodiments, motor carrier axis 330A, drive wheel axis 350A, swing arm axis 330B and swing wheel axis 350B are positioned to achieve a desired relationship between force F1 and force F2, and a desired relationship between distance D7 and distance D8. For example: F2=2*F1; and D7=2*D8.

Figure 4E:
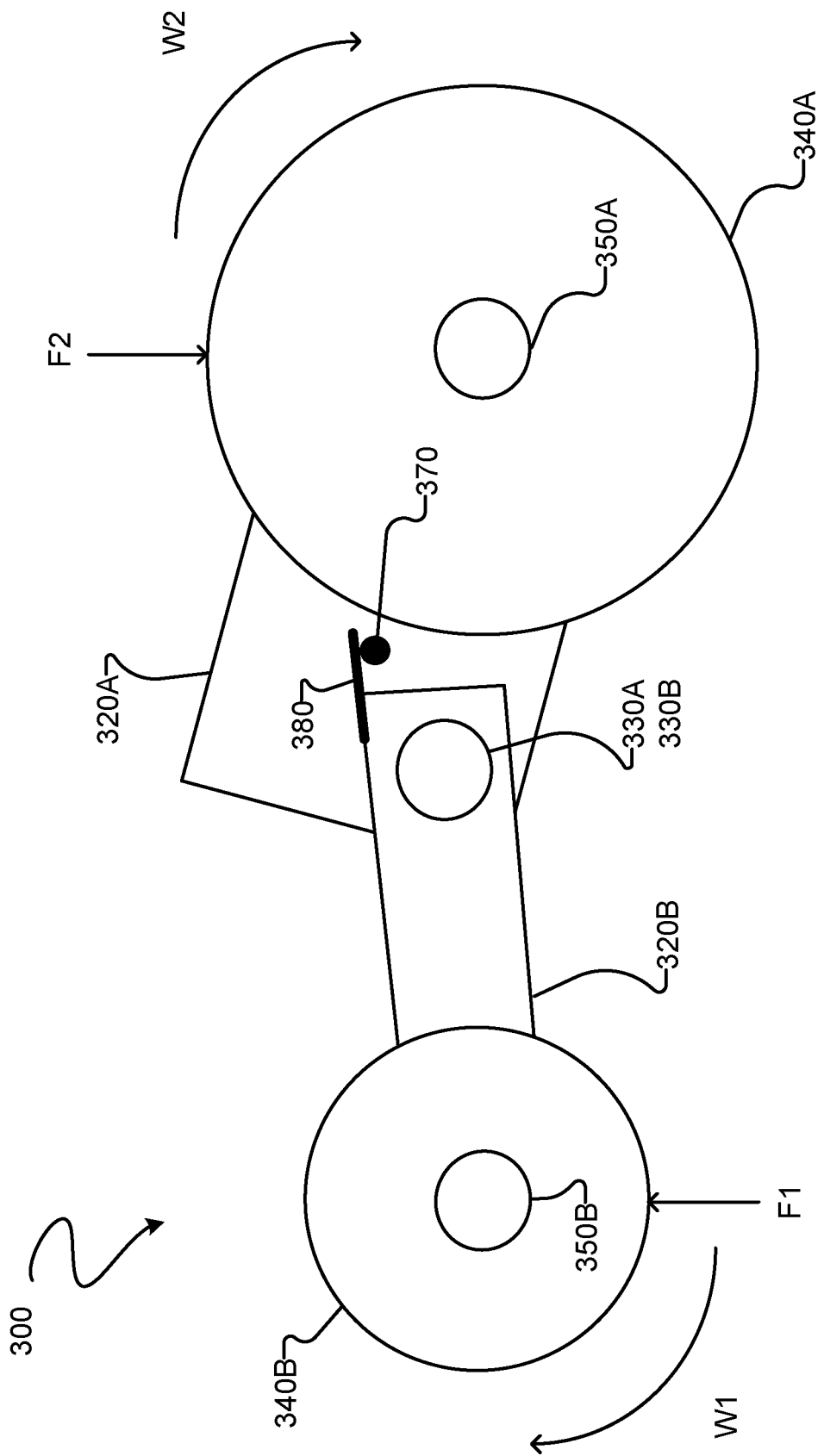

FIG. 4E is a side view of drive wheel 340A and swing wheel 340B engaged (as defined above). Force F1 on swing wheel 340B is transferred to swing arm 320B, and results in torque W1 on swing arm 320B about swing arm axis 330B. In FIG. 4E, force F1 is upward on swing wheel 340B, and resulting torque W1 is clockwise about swing arm axis 330B. Torque W1 urges swing arm 320B about swing arm axis 330B. Second contact surface 380 is in contact with first contact surface 370, and therefore, second contact surface 380 transfers torque W1 through first contact surface 370 into torque W2 on motor carrier 320A about motor carrier axis 330A. The direction of W2 is equal to W1; clockwise about motor carrier axis 330A. However, because drive wheel 340A is mounted on an opposing side of swing arm axis 330B as swing wheel 340B is mounted, torque W2 results in a downward force on drive wheel 340A.

While FIGS. 4A to 4E depict only one side of suspension 300, suspension 300 comprises a second side of similar, mirrored configuration to the first side depicted in FIGS. 4A to 4E.

Figure 4F:
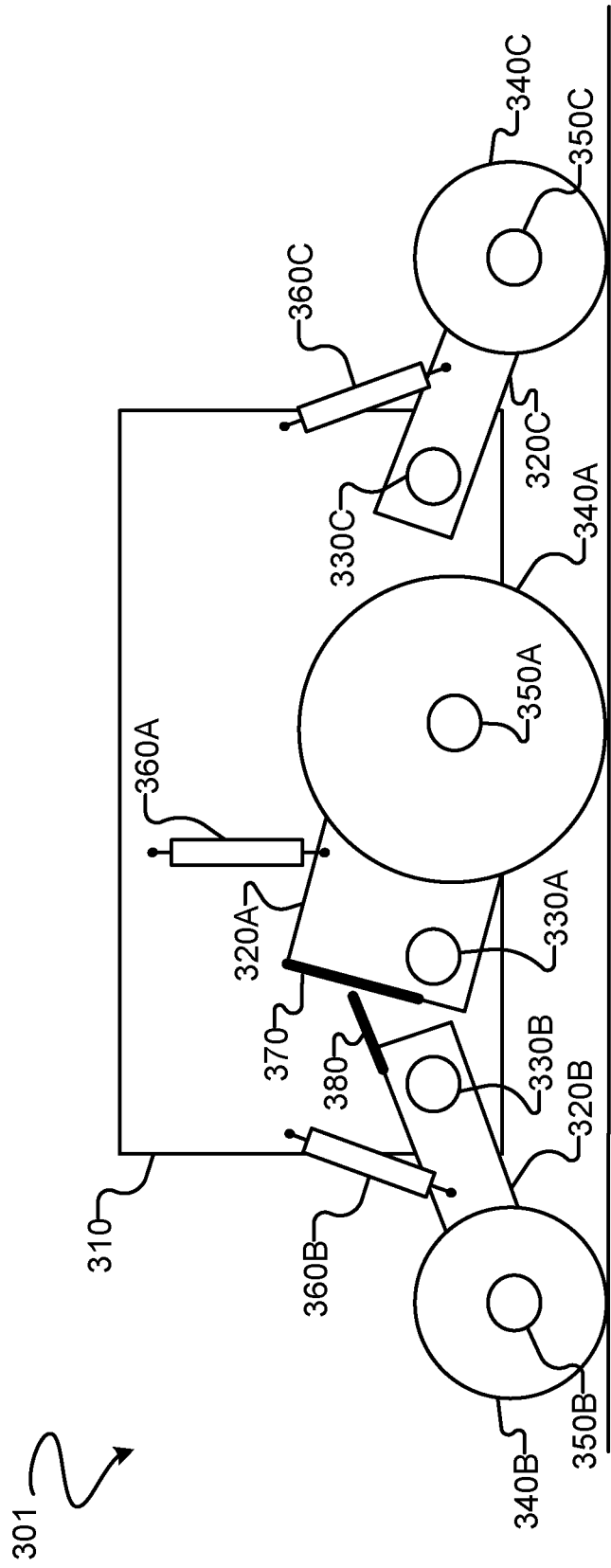
FIGS. 4F, 4G and 4H are schematic side views of other example embodiments of a wheelchair suspension.

FIG. 4F is a schematic side view of a wheelchair suspension 301 according to another example embodiment. FIG. 4F depicts motor carrier axis 330A spaced a distance apart from swing arm axis 330B (i.e. not coaxial). The torque transfer mechanism comprises first and second contact surfaces 370 and 380 configured to contact one another once swing arm 320B is raised by the engagement distance (as defined above). When swing arm 320B is raised further a resulting torque on swing arm 320B about swing arm axis 330B is transferred into a torque on motor carrier 320A about motor carrier axis 330A.

Figure 5A:
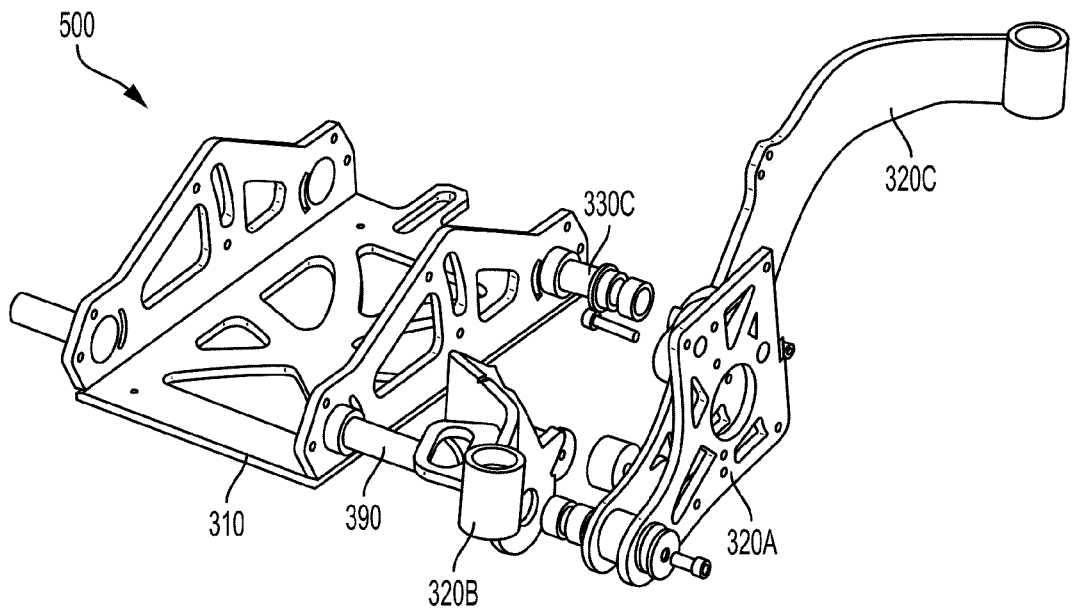
FIGS. 5A and 5B are exploded isometric views of a frame, swing arm, motor carrier and rear arm.
Figure 5B:
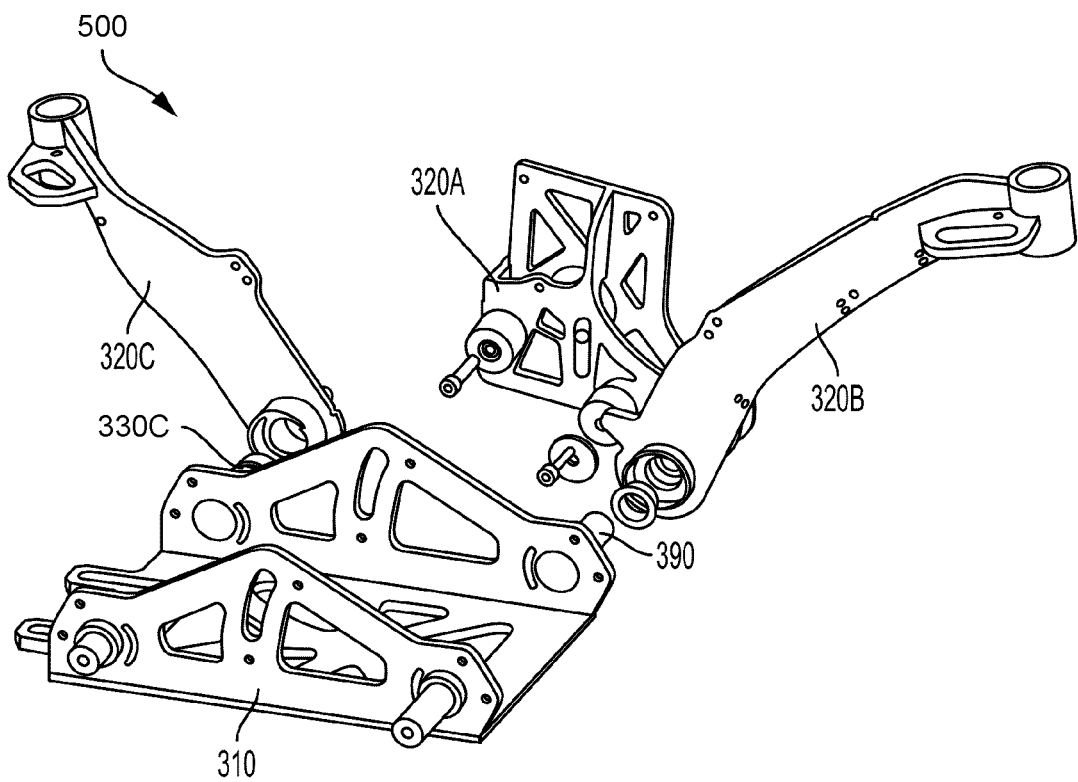

FIGS. 5A and 5B are partial exploded isometric views of an example suspension 500. Suspension 500 comprises frame 310, upon which are pivotally mounted swing arm 320B, motor carrier 320A, and rear arm 320C.

Frame 310 comprises a front pivot point 390 upon which are mounted both motor carrier 320A, and swing arm 320B. In some embodiments, motor carrier 320A and swing arm 320B each comprise an aperture, and front pivot point 390 comprises a front axle. Motor carrier 320A and swing arm 320B are mounted upon frame 310 by mounting the front axle through the respective apertures in each of motor carrier 320A and swing arm 320B. In such an embodiment, motor carrier 320A and swing arm 320B both pivot about the same axis.

Frame 310 further comprises a rear pivot point 330C upon which is mounted rear arm 320C. In some embodiments, rear arm 320C comprises an aperture, rear pivot point 330C comprises a rear axle, and rear arm 320C is mounted upon frame 310 by mounting the rear axle through the aperture in rear arm 320C.

FIGS. 5A and 5B depict swing arm 320B, motor carrier 320A, and rear arm 320C mounted on one side of frame 310. In the example embodiment, a second swing arm, a second motor carrier, and a second rear arm are similarly mounted on an opposing side of frame 310.

Figure 6:
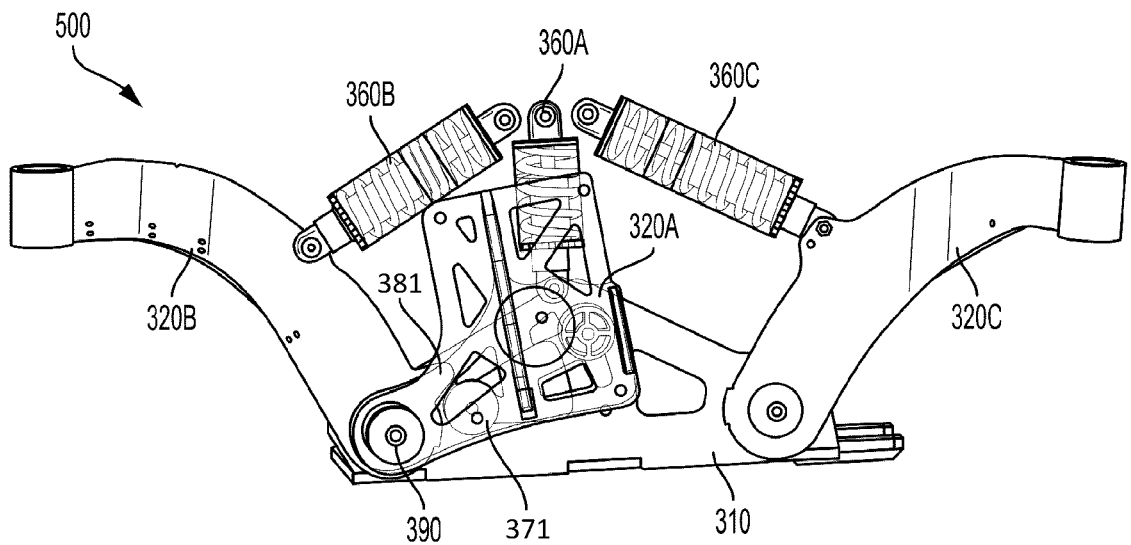
FIG. 6 is a partial side view of a wheelchair suspension.

FIG. 6 is a partial side view of a wheelchair suspension 500 according to another example embodiment. In the embodiment depicted in FIG. 6, first contact surface 370 comprises a surface of a disk 371 mounted on motor carrier 320A, and second contact surface 380 comprises a surface of a tab 381 formed on swing arm 320B. Disk 371 may comprise a resilient material such as rubber or another elastomer.

Figure 7:
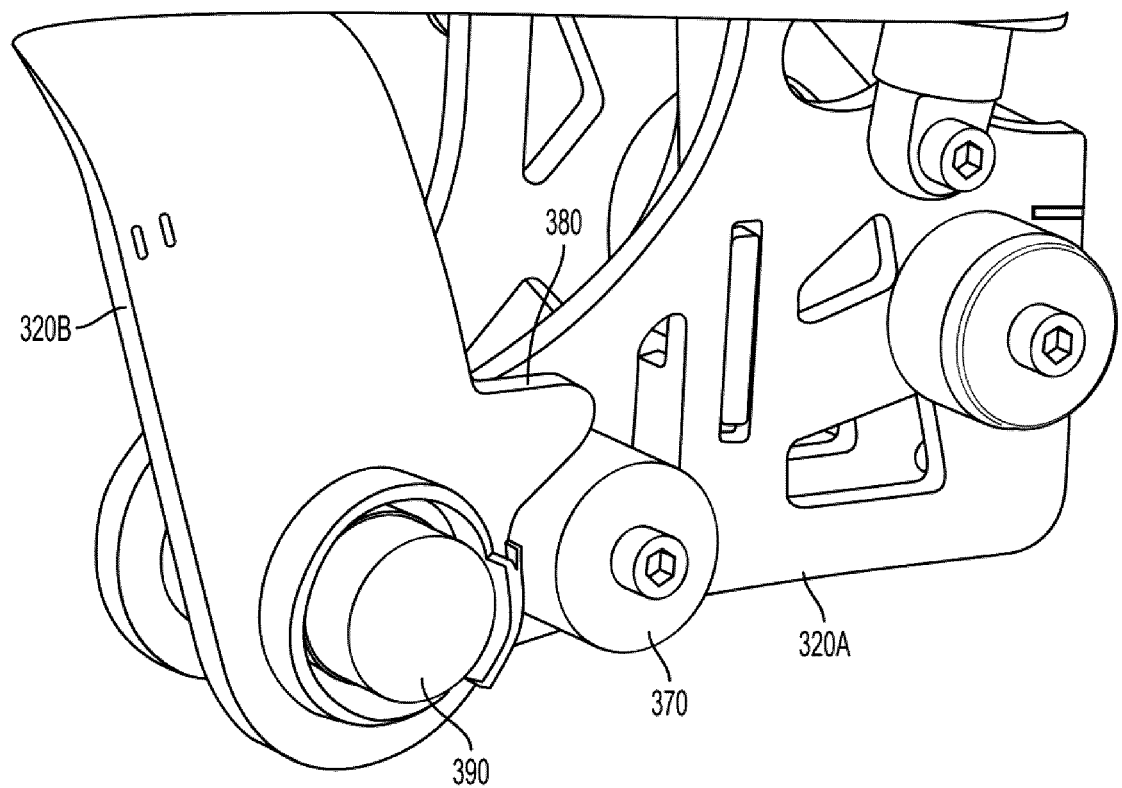
FIG. 7 is a view of a first and second contact surface according to an example embodiment.

FIG. 7 is a partial zoomed in side view of first contact surface 370 comprising a disk, and second contact surface 380 comprising a tab. In other embodiments, one or more of first contact surface 370 and second contact surface 380 may comprise:
    a projection;
    a slot;
    a tab;
    a flexibly resilient abutment element;
    a curved surface; and/or
    a disk.
Any of the example contact surfaces above may be integrally formed or mounted on the motor carrier 320A and/or swing arm 320B. In other embodiments one or more of contact surfaces 370 and 380 may be carried by one or more linkages, wherein the linkages are configured to cause contact surfaces 370 and 380 to move substantially in concert with motor carrier 320A and/or swing arm 320B and to become engaged when swing arm 320B is lifted sufficiently.

Figure 4G:
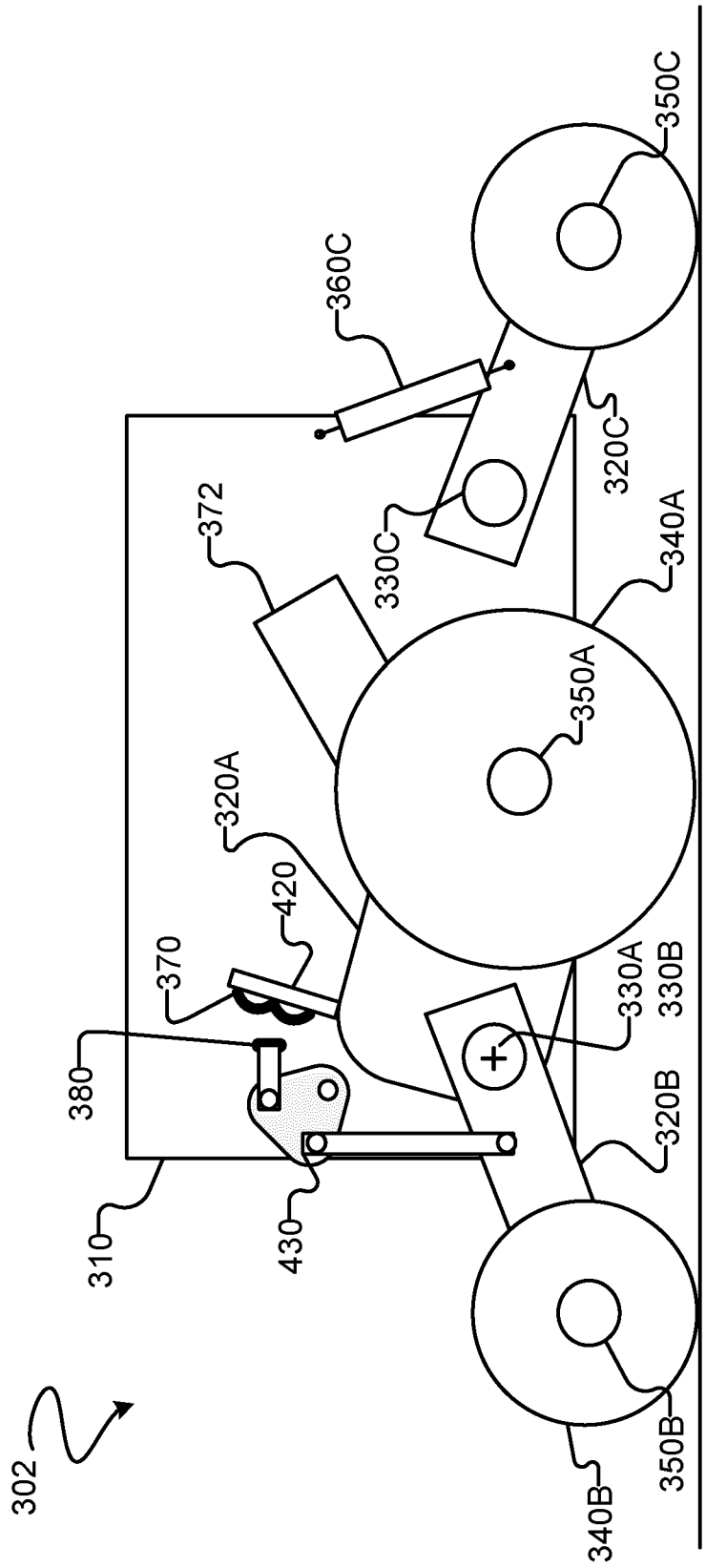

FIG. 4G is a schematic side view of a wheelchair suspension 302 according to another example embodiment. FIG. 4G depicts first contact surface 370 carried by tab 420, and second contact surface 380 carried by linkage 430. Tab 420 is connected to move substantially with motor carrier 320A, and linkage 430 is configured to move substantially with swing arm 320B. In other embodiments, one or both of first contact surface 370 and second contact surface 380 may be carried by a linkage.

In other embodiments, the torque transfer mechanism may comprise one or more components configured to transfer a variable amount of force between swing wheel 340B and drive wheel 340A. For example, the torque transfer mechanism may comprise a variable rate spring coupled between motor carrier 320A and swing arm 320B. The variable rate spring has a variable spring rate which increases as the spring is compressed so that the amount of additional force required to compress the spring by a given amount increases significantly as the spring becomes more compressed. In such embodiments, the engagement distance may be defined by the movement of the swing arm which causes the variable rate spring to compress sufficiently that the spring constant has increased by a desired factor compared to the spring constant of the variable rate spring when the suspension is in its neutral position configuration. For example, the spring constant once the swing wheel is raised by the engagement distance may be 2 or more or 5 or more times the spring constant when the swing arm is in its neutral position.

In other embodiments, the torque transfer mechanism may comprise one or more components configured to allow substantially independent movement of swing wheel 340B relative to drive wheel 340A within a range of movement, and substantially linked movement of swing wheel 340B and drive wheel 340A outside of the range of movement. For example, the torque transfer mechanism may comprise a dual-rate spring mounted between motor carrier 320A and swing arm 320B, so when swing arm 320B is raised by a distance less than the engagement distance (as defined above), the dual-rate spring compresses with a first lower spring constant and transfers only small forces F4 to motor carrier 320A, and when swing arm 320B is raised by a distance greater than the engagement distance, the dual-rate spring compresses with a second, significantly greater, spring constant and transfers much larger forces F5 to motor carrier 320A.

Figure 4H:
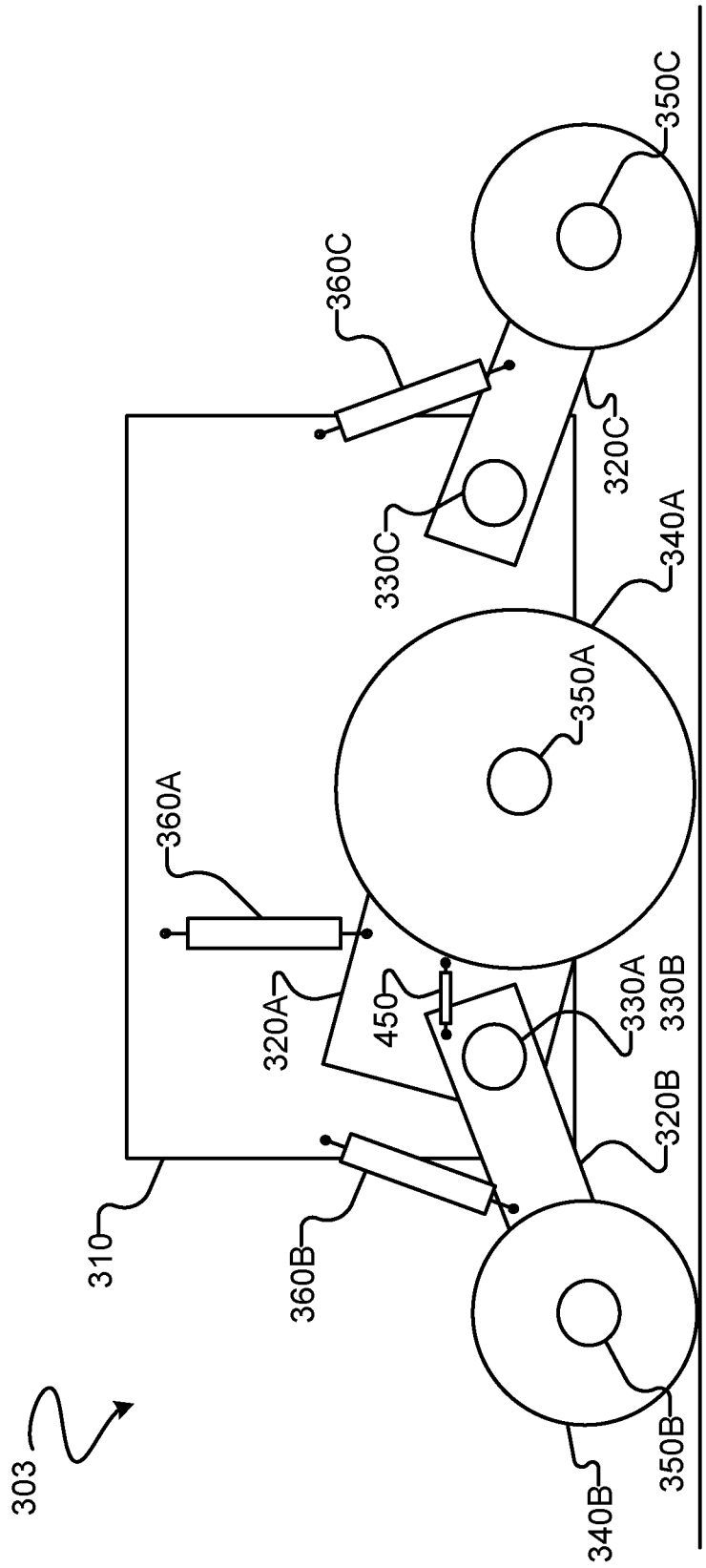

FIG. 4H is a schematic side view of a wheelchair suspension 303 according to another example embodiment. FIG. 4H depicts torque transfer mechanism 450 configured to allow substantially independent movement of swing wheel 340B relative to drive wheel 340A within a range of movement, and substantially linked movement of swing wheel 340B and drive wheel 340A outside of the range of movement.

Figure 8A:
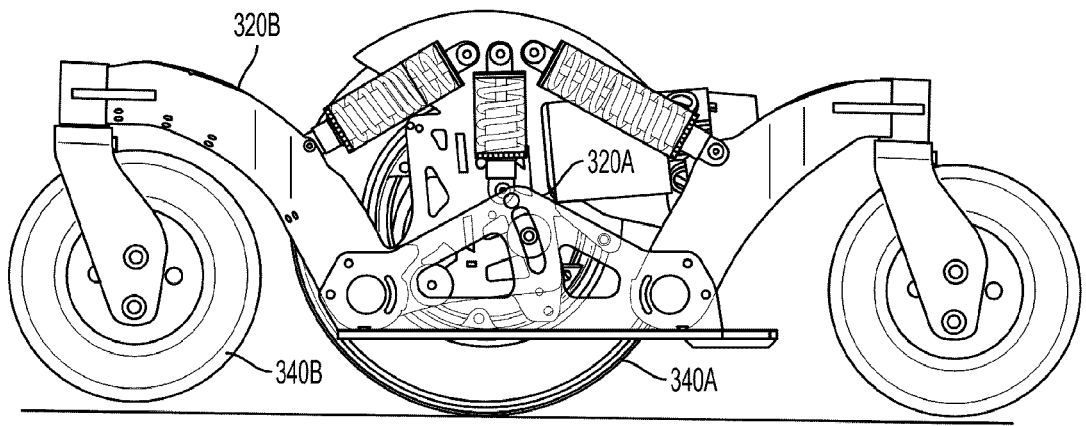
FIGS. 8A, 8B and 8C are side views of a wheelchair suspension depicting a swing arm in various positions relative to a motor carrier.
Figure 8B:
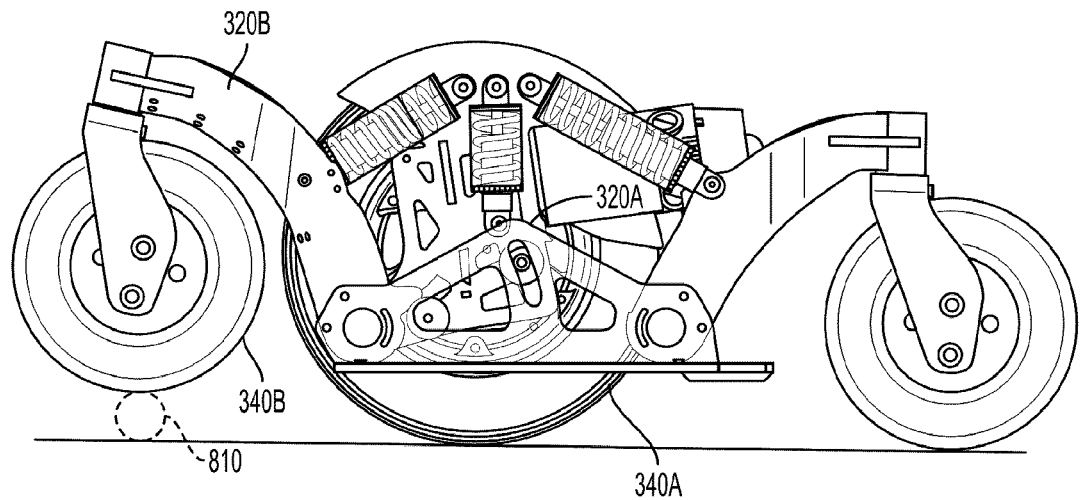
Figure 8C:
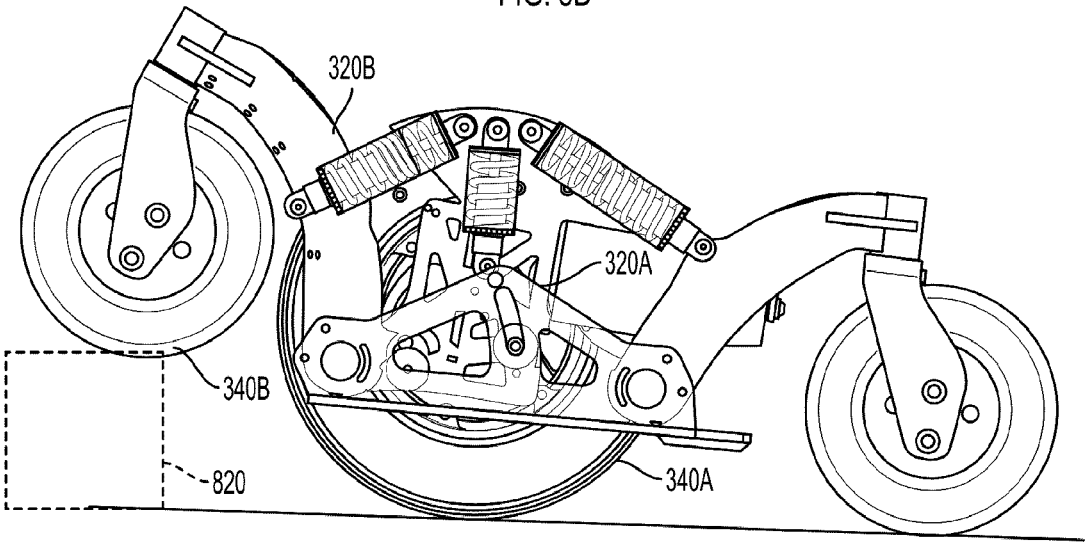

FIGS. 8A to 8C depict a range of positions of swing wheel 340B relative to drive wheel 340A in an example embodiment. FIG. 8A depicts movement across flat ground, wherein bottoms of swing wheel 340B and drive wheel 340A are aligned in a substantially horizontal plane.

FIG. 8B depicts movement of swing arm 320B and swing wheel 340B mounted thereon independently of motor carrier 320A and drive wheel 340A mounted thereon. Swing wheel 340B moves independently of drive wheel 340A so long as second contact surface 380 carried by swing arm 320B is not in contact with first contact surface 370 carried by motor carrier 320A (i.e. operating unengaged, as described above). When unengaged, swing wheel 340B and drive wheel 340A may move independently. This allows each of swing wheel 340B and drive wheel 340A to smoothly traverse small debris and/or bump 810.

FIG. 8C depicts movement of swing arm 320B and swing wheel 340B mounted thereon engaged with motor carrier 320A and drive wheel 340A mounted thereon, for example, when driving up onto curb 820. As the wheelchair is driven towards curb 820, swing wheel 340B is raised by the vertical component of the normal force on curb 820 from the wheelchair driving into curb 820. Once second contact surface 380 carried by swing arm 320B contacts first contact surface 370 carried by motor carrier 320A (i.e. operating engaged, as described above), further upward force on swing wheel 340B will be transferred into a downward force on drive wheel 340A. If a bottom of drive wheel 340A is resting on a surface, the downward force on drive wheel 340A will increase the friction between drive wheel 340A and the surface, thereby increasing the traction between drive wheel 340A and the surface. This will also tend to lift frame 310.

Unless the context clearly requires otherwise, throughout the description and the "comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

In addition, while elements are at times shown as being performed sequentially, they may instead be performed simultaneously or in different sequences. It is therefore intended that the following claims are interpreted to include all such variations as are within their intended scope.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

The invention claimed is:

1. A suspension for a wheelchair, the suspension comprising:
   a frame;
   a motor carrier pivotally mounted on the frame to rotate about a motor carrier axis;
   a drive wheel having a bottom and mounted on the motor carrier to rotate about a drive wheel axis;
   a swing arm pivotally mounted on the frame to rotate about a swing arm axis;
   a swing wheel having a bottom and mounted on the swing arm to rotate about a swing wheel axis;
   a first contact surface coupled to move in concert with the motor carrier; and
   a second contact surface coupled to move in concert with the swing arm and configured to contact the first contact surface and transfer an upward force on the swing wheel into a downward force on the drive wheel;
   wherein the second contact surface is configured to contact the first contact surface when the first swing arm rotates about the first swing arm axis an engagement angle from a neutral position, wherein the first swing arm is in the neutral position when the bottom of the first swing wheel and the bottom of the first drive wheel are aligned in a substantially horizontal plane.

2. The suspension according to claim 1, wherein the motor carrier axis and the swing arm axis are coaxial.

3. The suspension according to claim 1, comprising a motor carrier shock absorber connected between the frame and the motor carrier and configured to dampen a motion between the motor carrier and the frame, and a swing arm shock absorber connected between the frame and the swing arm and configured to dampen a motion between the swing arm and the frame.

4. The suspension according to claim 3, wherein:
   the motor carrier shock absorber is configured to bias the motor carrier towards a neutral position relative to the frame;
   the swing arm shock absorber is configured to bias the swing arm towards the neutral position relative to the frame; and
   the motor carrier is in the motor carrier neutral position and the swing arm is in the swing arm neutral position when the bottom of the drive wheel and the bottom of the swing wheel are aligned in a substantially horizontal plane.

5. The suspension according to claim 1, wherein the motor carrier axis, drive wheel axis, swing arm axis and swing wheel axis are substantially parallel and horizontal.

6. The suspension according to claim 1, wherein:
the swing arm axis is a first distance from the swing wheel axis;
the drive wheel axis is a second distance from the swing wheel axis; and
the second distance is greater than the first distance.

7. The suspension according to claim 1, wherein the upward force on the swing wheel causes a swing arm torque on the swing arm about the swing arm axis, and the second contact surface is configured to transfer the swing arm torque into a motor carrier torque on the motor carrier about the motor carrier axis, wherein a direction of the swing arm torque is substantially equal to a direction of the motor carrier torque.

8. The suspension according to claim 1, wherein the first contact surface is coupled to move in concert with the motor carrier by a first linkage.

9. The suspension according to claim 1, wherein the second contact surface is coupled to move in concert with the swing arm by a first linkage.

10. The suspension according to claim 1, wherein at least one of the first contact surface and the second contact surface comprise a projection.

11. The suspension according to claim 1, wherein at least one of the first contact surface and the second contact surface comprise a flexibly resilient abutment element.

12. The suspension according to claim 1, wherein at least one of the first contact surface and the second contact surface comprise a disk.

13. The suspension according to claim 1, comprising a rear arm mounted on the frame to rotate about a rear arm axis, and a rear wheel mounted on the rear arm to rotate about a rear wheel axis.

14. The suspension according to claim 13, wherein the rear wheel axis is a first distance from the swing wheel axis greater than a second distance from the swing wheel axis to the drive wheel axis.

15. The suspension according to claim 13, comprising a rear arm shock absorber connected between the frame and the rear arm to dampen a motion between the rear arm and the frame.

16. The suspension according to claim 1 comprising a motor for driving the drive wheel.

17. The suspension according to claim 16 wherein the motor is mounted on the motor carrier.

18. The suspension according to claim 17 comprising a chair mounted on the frame.

19. A suspension for a wheelchair, the suspension comprising:
a frame comprising a first side and a second side opposed to the first side;
a first motor carrier pivotally mounted on the first side of the frame to rotate about a first motor carrier axis;
a second motor carrier pivotally mounted on the second side of the frame to rotate about a second motor carrier axis;
a first drive wheel having a bottom and mounted on the first motor carrier to rotate about a first drive wheel axis;
a second drive wheel having a bottom and mounted on the second motor carrier to rotate about a second drive wheel axis;
a first swing arm pivotally mounted on the first side of the frame to rotate about a first swing arm axis;
a second swing arm pivotally mounted on the second side of the frame to rotate about a second swing arm axis;
a first swing wheel having a bottom and mounted on the first swing arm to rotate about a first swing wheel axis;
a second swing wheel having a bottom and mounted on the second swing arm to rotate about a second swing wheel axis;
a first contact surface coupled to move in concert with the first motor carrier;
a second contact surface coupled to move in concert with the first swing arm and configured to contact the first contact surface and transfer an upward force on the first swing wheel into a downward force on the first drive wheel;
a third contact surface coupled to move in concert with the second motor carrier; and
a fourth contact surface coupled to move in concert with the second swing arm and configured to contact the third contact surface and transfer an upward force on the second swing wheel into a downward force on the second drive wheel;
wherein the second contact surface is configured to contact the first contact surface when the first swing arm rotates about the first swing arm axis an engagement angle from a neutral position, wherein the first swing arm is in the neutral position when the bottom of the first swing wheel and the bottom of the first drive wheel are aligned in a substantially horizontal plane.

20. The suspension according to claim 19, wherein the first motor carrier axis, the second motor carrier axis, the first swing arm axis and the second swing arm axis are coaxial.

* * * * *